United States Patent
Des Jardins et al.

(10) Patent No.: US 9,047,624 B1
(45) Date of Patent: Jun. 2, 2015

(54) AUDITING OF CONTENT RELATED EVENTS

(75) Inventors: G. Thomas Des Jardins, Alexandria, VA (US); Jeffrey Dalton Porter, Flower Mound, TX (US); Vinayak Raghuvamshi, Alexandria, VA (US); Bryan Slavin, Rockville, MD (US); Paul Miller, Washington, DC (US)

(73) Assignee: Advertising.com LLC, Dulles, VA (US)

( * ) Notice: Subject to any disclaimer, the term of this patent is extended or adjusted under 35 U.S.C. 154(b) by 2654 days.

(21) Appl. No.: 11/023,631

(22) Filed: Dec. 29, 2004

Related U.S. Application Data

(60) Provisional application No. 60/601,654, filed on Aug. 16, 2004.

(51) Int. Cl.
*H04N 7/10* (2006.01)
*G06Q 30/02* (2012.01)

(52) U.S. Cl.
CPC .................................. *G06Q 30/0272* (2013.01)

(58) Field of Classification Search
USPC ................... 705/1; 707/13; 709/217; 725/35; 348/461
See application file for complete search history.

(56) References Cited

U.S. PATENT DOCUMENTS

| | | | |
|---|---|---|---|
| 6,426,778 B1 * | 7/2002 | Valdez, Jr. | 348/461 |
| 6,463,585 B1 * | 10/2002 | Hendricks et al. | 725/35 |
| 6,772,200 B1 * | 8/2004 | Bakshi et al. | 709/217 |
| 7,171,402 B1 * | 1/2007 | Chatani | 1/1 |
| 2005/0038666 A1 * | 2/2005 | Theiste et al. | 705/1 |

* cited by examiner

*Primary Examiner* — John G. Weiss
*Assistant Examiner* — Marilyn G Macasiano
(74) *Attorney, Agent, or Firm* — Finnegan, Henderson, Farabow, Garrett & Dunner, LLP

(57) ABSTRACT

At times, it may be desirable to determine that a client system is, or to determine the number of client systems that are, presenting particular dynamic content when an auditable event occurs in the dynamic content. One manner of making the determination may include accessing presentation time information that indicates the time(s) at which one or more client systems present particular dynamic content and accessing event time information indicating the time(s) at which one or more auditable events occur in the dynamic particular content. Based on the presentation time information and the event time information, it may be possible to determine that a client system is, or to determine the number of client systems that are, presenting particular dynamic content when an auditable event occurs in the dynamic content.

25 Claims, 9 Drawing Sheets

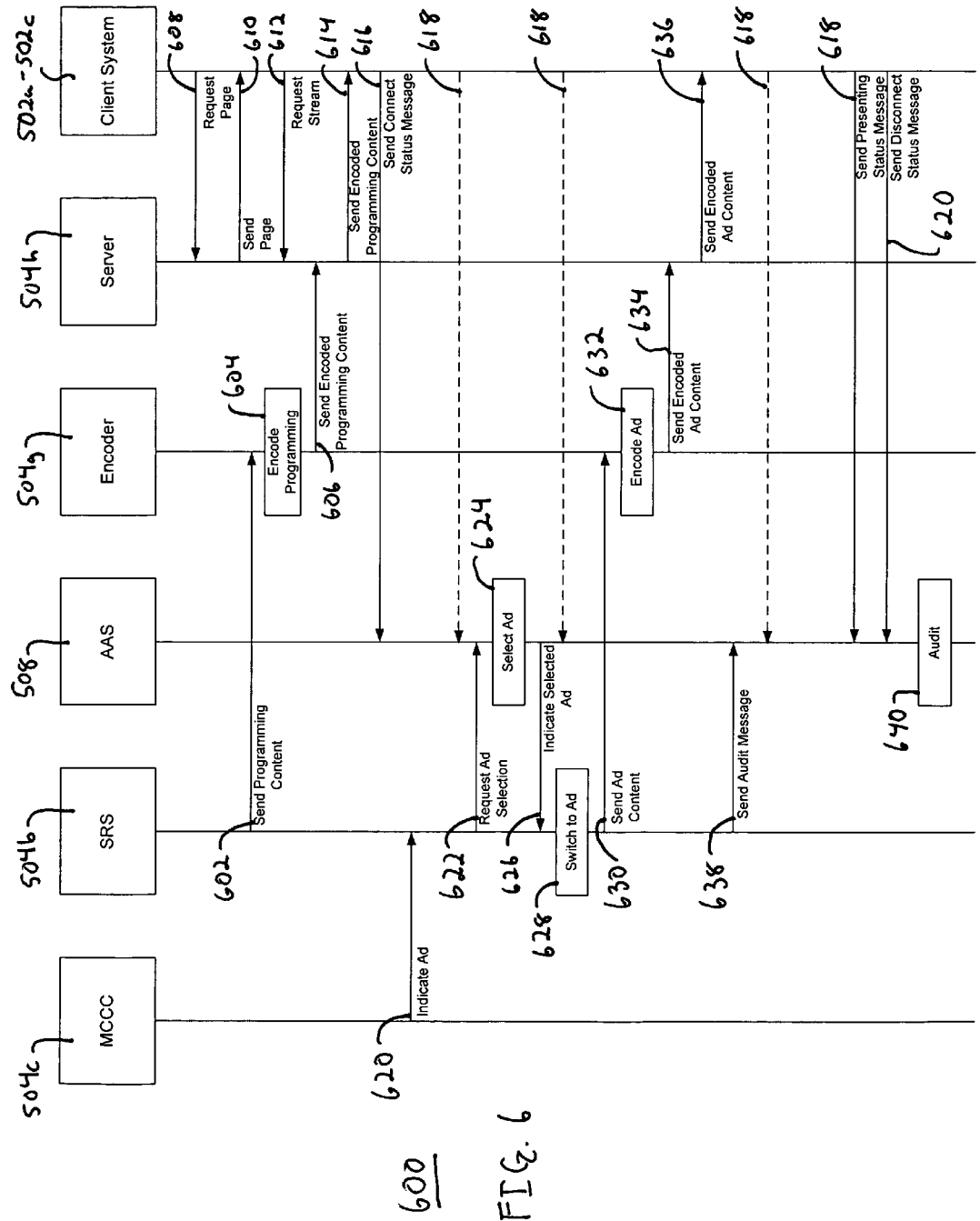

700

| StreamID (702) | Number of Unique Users Currently Connected (704) |
|---|---|
| 101 | 1000 |
| 102 | 50 |
| 103 | 222 |

| StreamID: 101 | | | |
|---|---|---|---|
| Advertising ID (752) | Date (754) | Time Started (756) | Number of Unique Users Connected (758) |
| 500413 | 11/11/04 | 9:02 am | 267 |
| 612452 | 11/11/04 | 9:37 am | 321 |
| 176234 | 11/11/04 | 9:58 am | 1000 |

FIG. 7B

AUDITING OF CONTENT RELATED EVENTS

CLAIM OF PRIORITY

This application claims priority under 35 USC §119(e) to U.S. Provisional Patent Application Ser. No. 60/601,654, filed on Aug. 16, 2004, which is hereby incorporated by reference.

TECHNICAL FIELD

This description relates to auditing of content related events.

BACKGROUND

Dynamic content may be delivered and presented to users across packet-based networks, such as the Internet. Dynamic content generally refers to content that continuously or nearly continuously changes over time (i.e., content with a temporal dimension), such as audio and/or visual content. When sent over a packet-based network, such dynamic content may be, for example, downloaded content that is fully transmitted to a client system before the client system presents the content. Alternatively, such dynamic content may be, for example, streaming content such as streaming audio and/or video. Streaming content generally refers to content that is sent as a continuous stream and presented as it is received at a client system. Thus, a user of a client system that is receiving streaming content does not wait until the content is fully downloaded before the dynamic content is presented, as is the case for downloaded content. Rather, the client system receiving streaming content usually downloads and buffers a portion of the dynamic content. The client system then presents the buffered portion as the rest of the dynamic content is downloading.

Streaming content may be sent from a pre-encoded (or otherwise pre-prepared) file (referred to as "on-demand" streaming) or may be distributed as part of a live broadcast feed (referred to as "live" streaming). For live streaming, a live broadcast feed is typically encoded into a compressed digital signal as the broadcast feed is received, for example, by an encoder and the encoded signal is transmitted from a server that is able to do multicast; that is, able to send the same signal to multiple client systems at the same time. The broadcast feed may depict live activity (that is, activity occurring as the feed is broadcasted) or may depict previously recorded activity.

Different segments of dynamic content may be coupled together to form a collection of dynamic content. In addition, different types of dynamic content may be coupled together to form a collection of different types of dynamic content. The different types of dynamic content may include, for example, programming content and advertising content. Programming content is generally the editorial content that a user desires to have presented. Advertising content is generally any other content besides the editorial content and is typically content that promotes particular services or goods. Advertising content may be, for example, previews for programming content being offered in the future (referred to as "previews"), an indication of the source of programming content (referred to as "branding"), or promotions to buy or otherwise acquire specific products or services (referred to as "advertisements").

The different types of dynamic content may be coupled in a collection such that they are presented sequentially or simultaneously. For example, advertisements may be presented sequentially with programming content, while branding may be presented simultaneously with programming content by being, for instance, overlaid on the programming content or presented next to the programming content.

SUMMARY

At times, it may be desirable to determine that a client system is, or to determine the number of client systems that are, presenting particular dynamic content when an auditable event occurs in the dynamic content. For example, an auditable event in particular dynamic content may be the occurrence of particular advertising content in the dynamic content. One manner of making such a determination is to embed an instruction or other data in the dynamic content that, for example, causes a client system presenting the particular dynamic content to send a message or other data to an auditing system. The message or other data may indicate that the auditable event has occurred, is occurring, or will occur, and may identify the particular auditable event. For instance, an instruction in dynamic content may cause a client system to send a message that indicates the client system is presenting advertising content and identifies the particular advertising content being presented.

In some situations, however, the dynamic content may not include the embedded instructions. In such situations, one manner of making the determination may include accessing presentation time information that indicates the time(s) at which one or more client systems present particular dynamic content and accessing event time information indicating the time(s) at which one or more auditable events occur in the dynamic particular content. Based on the presentation time information and the event time information, it may be possible to determine that a client system is, or to determine the number of client systems that are, presenting particular dynamic content when an auditable event occurs in the dynamic content.

For instance, when one or more client systems are presenting dynamic content, one or more status messages may be sent to an auditing system by the client system(s). The status messages may indicate the particular dynamic content being presented. The time(s) at which the client system presents the dynamic content may be determined based on the status message(s), for example, by accessing time information included in the status message(s), or by determining a time or times at which the status message(s) were received, were generated, or were transmitted by the client system(s). Based on the status messages, the auditing system may determine, for example, the number of client systems that are presenting the particular dynamic content at a particular time.

The auditing system also, for example, may receive one or more audit messages that identify particular auditable events in the dynamic content. The audit messages may be received, for example, from a content distribution system. The time or times at which the particular auditable events occur in the dynamic content may be determined by the auditing system based on the audit messages, for example, by accessing time information included in the audit message(s), or by determining a time or times at which the audit message(s) were received, were generated, or were transmitted.

For a particular auditable event, the auditing system then may determine, for instance, the number of client systems that were presenting the particular dynamic content when the particular auditable event occurred in the dynamic content. For example, based on the status messages, the auditing system may continuously record the number of client systems presenting the particular dynamic content at a given time.

When the auditing system receives an audit message, the auditing system may access the number of client systems currently presenting the dynamic content and associate the number of client systems with the particular auditable event identified by the received audit message.

More generally, in one aspect, presentation time information is accessed. The presentation time information indicates one or more times at which a presentation of dynamic content occurs at a client system. Event time information also is accessed. The event time information indicates a time at which an auditable event occurs in the dynamic content. A determination is made, based on the presentation time information and the event time information, that the presentation of the dynamic content occurs at the client system at the time at which the auditable event occurs in the dynamic content.

In another aspect, status messages are received at an auditing system from one or more client systems. The status messages are sent by the one or more client systems as the one or more client systems present dynamic content. The status messages also identify the dynamic content being presented by the client system. Based on the status messages, one or more presentation times at which the one or more client systems present the dynamic content is determined. Also, an audit message is received at the auditing system from a content distribution system. The audit message indicates an occurrence of an auditable event in the dynamic content. Based on the audit message, an event time at which the auditable event occurs in the dynamic content is determined. Based on the one or more presentation times and the event time, a number of client systems presenting the dynamic content when the auditable event occurs in the dynamic content is determined.

Implementations may include one or more of the following features. For example, a status message may be received from the client system and include presentation information. The presentation time information may be determined based on the status message. Determining the presentation time information based on the status message may include determining the presentation time information based on time information included in the status message. Determining the presentation time information based on the status message may include determining the presentation time information based on a time at which the status message is received from the client system.

The status message may be received from the client system prior to, while, or after the client system presents the dynamic content.

An audit message including event information may be received and the event time information may be determined based on the audit message. The audit message may be received from a content distribution system and, particularly, a scheduler. Determining the event time information based on the audit message may include determining the event time information based on time information included in the audit message. Determining the event time information from the audit message may include determining the event time information based on a time at which the audit message is received.

Determining, based on the presentation time information and the event time information, that the presentation of the dynamic content occurs at the client system at a time at which the auditable event occurs in the dynamic content may include determining that the client system is presenting the dynamic content at the time the audit message is received.

The presentation time information and the event time information may be accessed at the client system, an auditing system separate from the client system and a content distribution system, and/or at the content distribution system.

The auditable event may include an occurrence of advertising content in the dynamic content or an occurrence in the dynamic content of an instruction to present advertising content in proximity to a presentation of the dynamic content.

The dynamic content may include live streaming content or on-demand streaming content. Quality of service information may be received from the client system and indicate a quality of the presentation of the dynamic content at the client system.

Implementations of the described techniques may include hardware, a method or process, and computer software on a computer-accessible medium.

The details of one or more implementations are set forth in the accompanying drawings and the description below. Other features will be apparent from the description and drawings, and from the claims.

DESCRIPTION OF DRAWINGS

FIG. 6 is a diagram illustrating an example of communications between the components of the implementation shown in FIG. 5.

FIGS. 7A and 7B illustrate tables that may be used in the implementation shown in FIG. 5.

DETAILED DESCRIPTION

Figure 1:
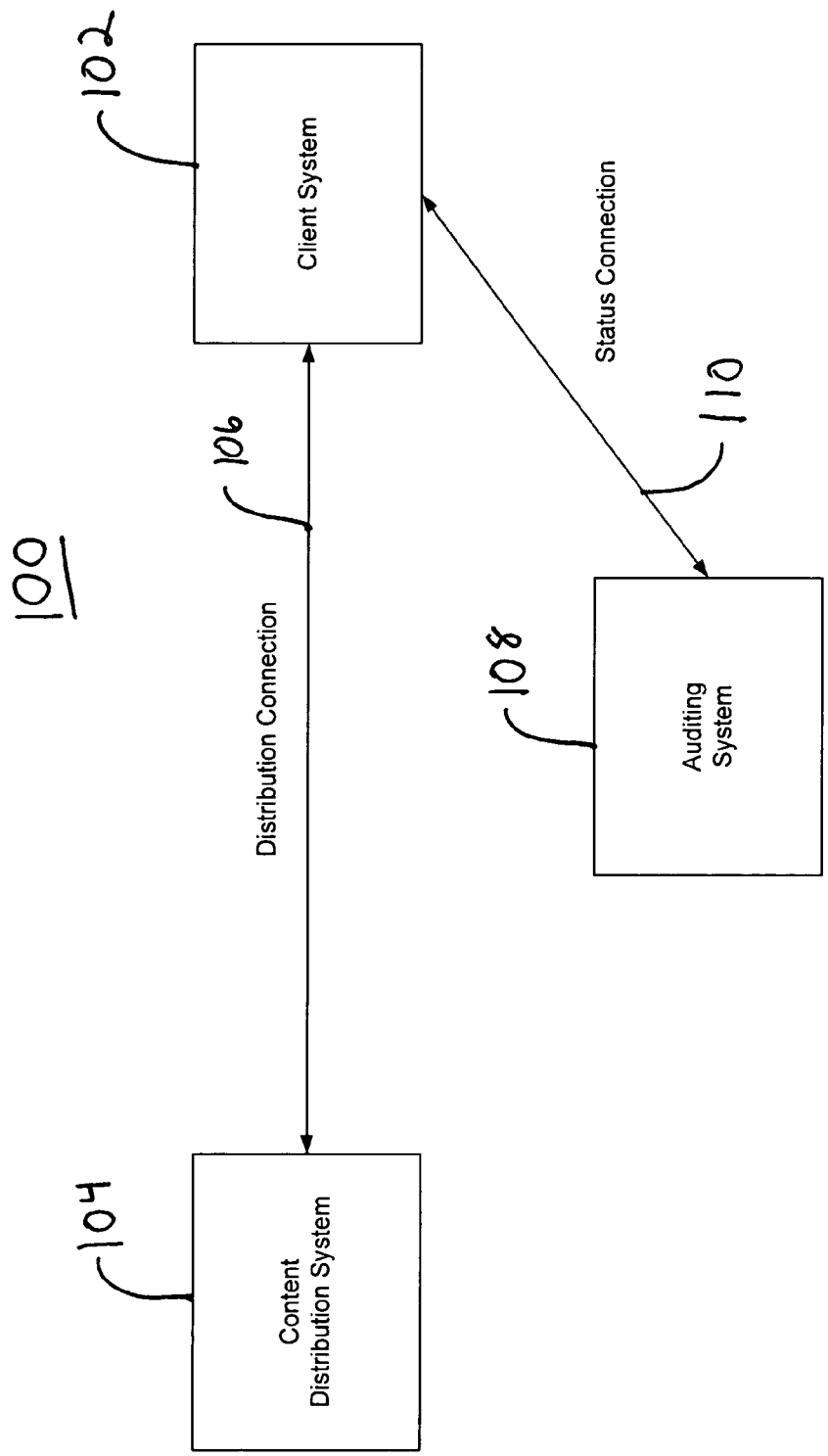
FIG. 1 is a block diagram of a system that provides auditing of auditable events related to dynamic content.

Referring to FIG. 1, a system 100 includes one or more client systems 102 connected to a content distribution system 104 by one or more distribution connections 106. System 100 also includes an auditing system 108 connected to client systems 102 over one or more status connections 110.

Client systems 102, content distribution system 104, and auditing system 108 may be implemented using, for example, one or more of a general-purpose computer capable of responding to and executing instructions in a defined manner, a personal computer, a special-purpose computer, a workstation, a server, a device, a component, or other equipment or some combination thereof capable of responding to and executing instructions. These components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal. Furthermore, when one or more components are used to implement client system 102, content distribution system 104, or auditing system 108, the components may communicate with one another across packet-based or non-packet-based networks to implement the respective functions of client system 102, content distribution system 104, or auditing system 108.

Client systems 102 may execute a hypertext transfer protocol (HTTP) based web browser that presents media pages, such as hypertext markup language (HTML) or other markup language web pages. A media client application may be embedded in one or more of the web pages presented by the web browser. The media client application presents dynamic content, such as audio content or video content, to a user through, for example, visual, auditory, or tactile presentation devices. The media client application also may implement the HTTP protocol to request the dynamic content.

Alternatively, the media client application may be a stand-alone application that presents both static content, such as the static portion (for example, text or pictures) of web pages, and the dynamic content such as audio or video content. A stand-alone media client application also may implement HTTP to request the static content and/or the dynamic content. Examples of a media client application include Windows Media Player from Microsoft Corp. of Redmond, Wash. and RealPlayer from RealNetworks of Seattle, Wash., both of which can be stand-alone or embedded into a web page.

Content distribution system 104 may include a content server or other server that executes HTTP server software to respond to data requests from an HTTP-based web browser and/or an HTTP-based media client application executing at client system 102. In response to a data request for a webpage received from the web browser or media client application, the content server provides a media page, for example a web page, for presentation by the web browser or media client application.

The web page may present one or more selections of dynamic content, including live streaming or on-demand content. When a user selects dynamic content, the media client application may download and present the selected dynamic content.

Distribution connection 106, status connection 110, and auditable event connection 112 may be implemented using packet-based or non-packet-based communications networks such as Wide Area Networks (WANs), Local Area Networks (LANs), analog or digital wired and wireless telephone networks (for example, a Public Switched Telephone Network (PSTN), an Integrated Services Digital Network (ISDN), or a Digital Subscriber Line (xDSL)), or another wired or wireless network including, for example, a corporate LAN. Distribution connection 106, status connection 110, and auditable event connection 112 may include multiple networks or sub-networks, each of which may include, for example, packet-based or non-packet-based communications networks.

Client systems 102 may receive and present dynamic content from a content distribution system 104 over one or more distribution connections 106. The dynamic content received by client system 102 may include a collection of dynamic content. The collection may include different types of dynamic content, such as programming content and advertising content. The dynamic content may be stored and provided as one or more segments of dynamic content. For instance, advertising content may be provided as one segment requested by client system 102, while programming content is provided as another segment requested by client system 102. Furthermore, the dynamic content may be received as streaming content, and may be live streaming content or on-demand streaming content.

The dynamic content also may include data that may or may not be presented by the media client application. The data may be processed as the media client application processes the dynamic content for presentation. The data may include, for example, information indicating the location of different segments of dynamic content in a collection of dynamic content (for example, uniform resource locators (URLs) may indicate different segments of dynamic content to be presented as a collection). As another example, the data may include instructions that cause the media client application or web page to display other static or dynamic content in proximity to the original dynamic content.

The dynamic content may contain auditable events. Such an auditable event may be an event that occurs in the dynamic content for which it is desirable to determine the number of client systems presenting the dynamic content at the time the event occurs. For example, when the dynamic content is a collection of different types of dynamic content, the event may be the occurrence of one type of dynamic content in the collection, such as advertising content. Determining the number of client systems presenting the dynamic content when advertising content occurs may be performed so that advertisers can be appropriately billed based on how many people viewed the advertising content, assuming someone is watching the advertising content when a client system presents it.

As another example of an auditable event, there may be static advertisements, such as banner ads, displayed next to a presentation of the dynamic content. Which banner ad is shown and at what time may depend on the dynamic content being presented and may be selected based on data included in the dynamic content. The event may be instructions in the dynamic content to display a particular banner ad. It may be desirable to know the number of client systems 102 that were presenting the dynamic content at a particular time so as to know how many client systems 102 presumably processed the instruction, resulting in the corresponding banner ad being presented.

Figure 2:
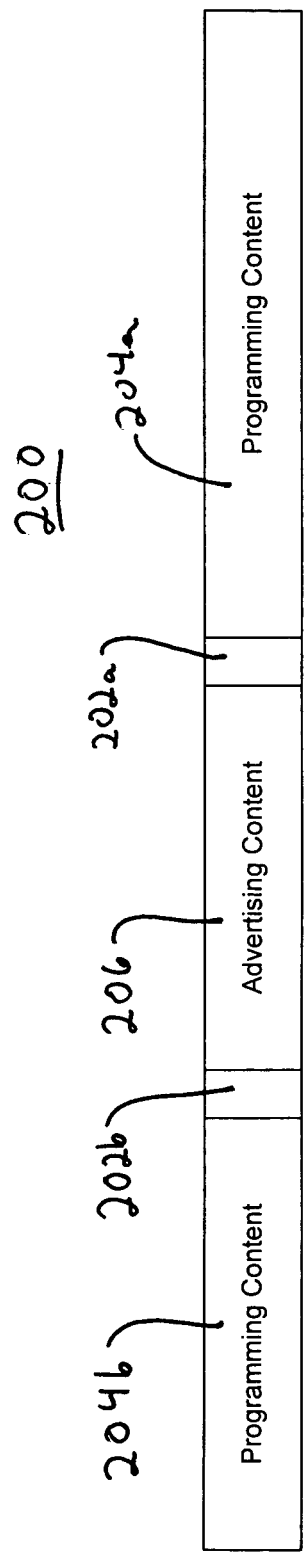
FIG. 2 is a diagram illustrating a stream of dynamic content.

Referring to FIG. 2, auditing tags 202*a* and 202*b* may be embedded in a collection 200 of dynamic content, for example, to determine the number of client systems presenting the dynamic content when a certain type of dynamic content is presented. The collection 200 shown includes programming content 204*a* and 204*b* and advertising content 206. Auditing tag 202*a* is embedded after programming content 204*a* but before advertising content 206. Auditing tag 202*b* is embedded after advertising content 206, but before programming content 204*b*. Auditing tags 202*a* and 202*b* cause client systems 102 to send a message to auditing system 108 via status connection 110 indicating, respectively, that client system 102 has started presenting advertising content 206 and finished presenting advertising content 206.

Accordingly, client system 102 receives and presents programming content 204*a*. Once programming content 204*a* is completed, client system 102 processes auditing tag 202*a*, which causes client system 102 to send a message to auditing system 108. The message indicates that client system 102 is beginning the presentation of advertising content 206 and includes an identification of advertising content 206. After presenting advertising content 206, client system processes auditing tag 202*b*, which causes client system 102 to send a message to auditing system 108 that indicates client system 102 has completed the presentation of advertising content 206. Client system 102 then presents programming content 204*b*. Based on the messages auditing system 108 receives from one or more client systems 102 as a result of auditing tags 202*a* and 202*b*, auditing system can determine the number of client systems 102 that presented advertising content 206.

In certain situations, however, auditing tags such as those shown in FIG. 2 may not be embedded in dynamic content. For example, when the dynamic content is a live stream, the equipment or entity encoding the dynamic content may be unable or unwilling to appropriately embed auditing tags into the encoded stream. In other instances, even though the auditing tags are embedded in the dynamic content, a client system may not be able to process the auditing tags appropriately. Accordingly, even though some client systems may appropriately indicate that the dynamic content was presented when the auditable event occurred, others may not, resulting in an inaccurate audit of the auditable event.

Figure 3:
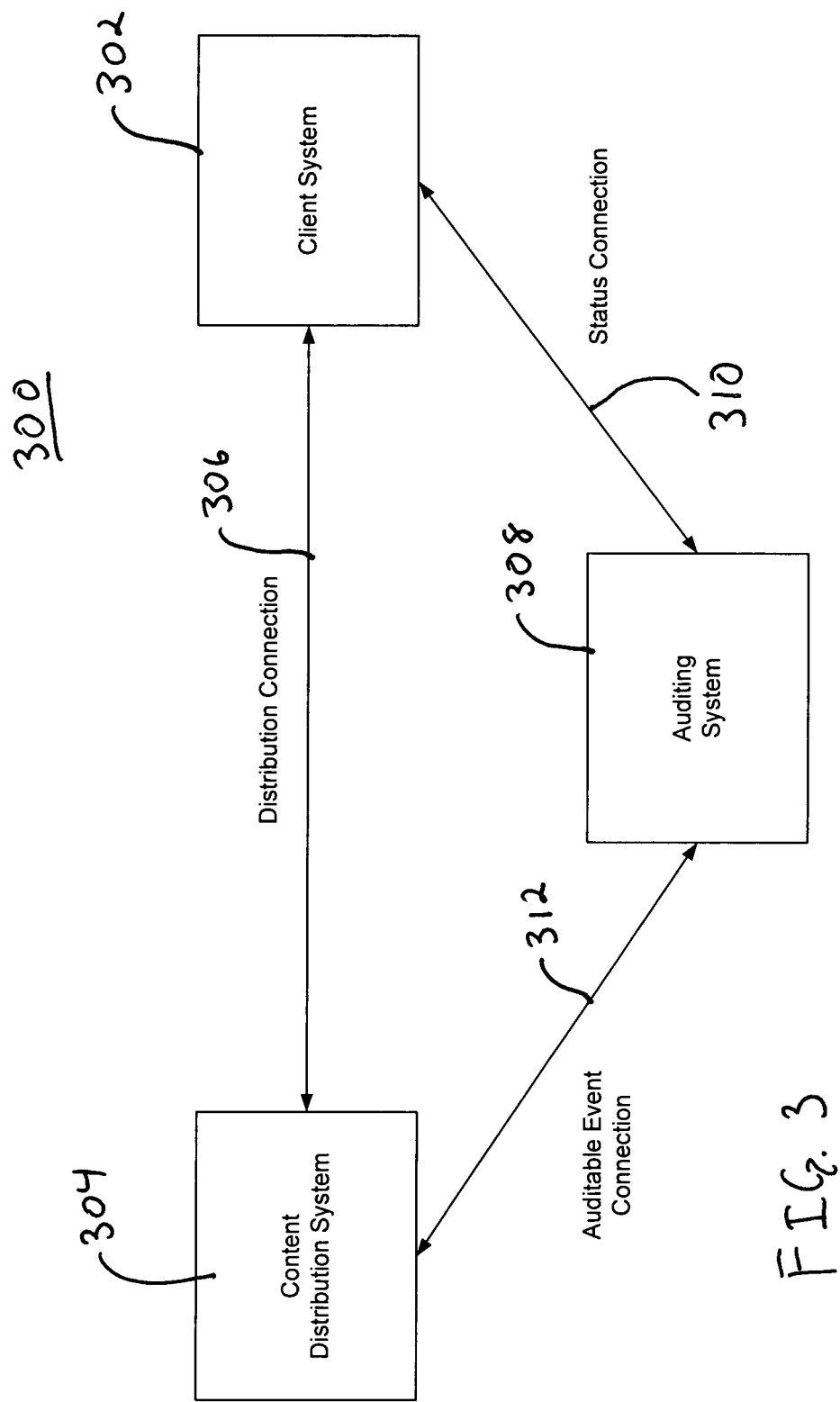
FIG. 3 is a block diagram of an alternate system that provides auditing of auditable events related to dynamic content.

Referring to FIG. 3, a system 300 is similar to system 100, including a client system 302, communicating with (i) a content distribution system 304 over a distribution connection 306 and (ii) an auditing system 308 over a status connection 310. Elements 302, 304, 306, 308, and 310 are analogous to elements 102, 104, 106, 108, and 110, respectively, of FIG. 1. System 300 includes additional aspects that include auditing system 308 receiving audit messages from content distribution system 304 over an auditable event connection 312 and client system 302 sending periodic or aperiodic status messages over status connection 310. The audit messages may indicate the time at which an auditable event occurs. The status messages may identify the dynamic content presented by the client system, and in some implementations, may indicate a time at which the dynamic content was presented, or may indicate for how long the dynamic content was presented. Auditing system 308 then may use the status messages and the audit messages to determine a number of client systems 302 presenting the dynamic content at the time when the auditable event occurred.

Figure 4:
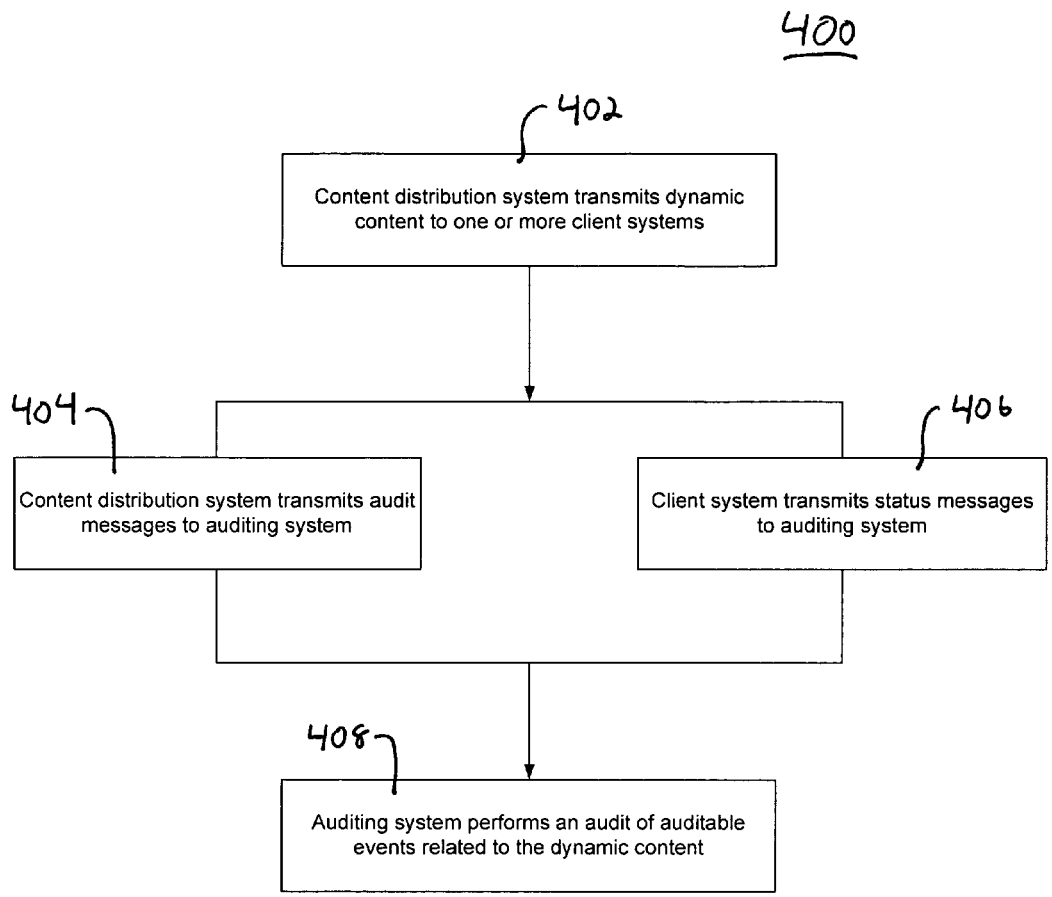
FIG. 4 is a flow chart generally illustrating a process that may be performed by the system of FIG. 3.

Referring to FIG. 4, an auditing process 400 may be performed by system 300. Process 400 includes content distribution system 304 transmitting dynamic content to one or more client systems 302 (402). The dynamic content may be streaming content or may be, for example, completely downloaded to client system 302 before being presented. The dynamic content may be, for example, live or on-demand content. As suggested earlier, the dynamic content may be a collection of dynamic content.

Process 400 further includes content distribution system 304 transmitting to auditing system 308 one or more audit messages that include event information that indicates an auditable event has occurred, is occurring, or will occur in the dynamic content and identifies the corresponding auditable event (404). The event information may include one or more times at which an auditable event occurs in the dynamic content. The time may be relative to the beginning or other point in the dynamic content (for example, one hour after beginning) or may be absolute (for example, 3:00 pm EST). For example, in a live streaming implementation, absolute time may be used because client systems 302 may receive the same feed at approximately the same time. Thus, the auditable event is likely to occur on client systems 302 at approximately the same absolute time.

In an on-demand streaming implementation, however, relative time may be used because client systems 302 are unlikely to receive the dynamic content at approximately the same time. Thus, the absolute time an auditable event occurs for one client system 302 is likely to be different from the absolute time the same auditable event occurs for another client system 302. But, the auditable events may occur at the same relative time, for example, a set time after the beginning or other point in the dynamic content.

Content distribution system 304 may transmit an audit message substantially simultaneously with the occurrence of the auditable event. For instance, in a live streaming implementation, content distribution system 304 may send an audit message at or about the absolute time an auditable event occurs in the live stream. The event information in an audit message sent substantially simultaneously with the occurrence of the auditable event may not include time information. Rather, the time the auditable event occurs may be determined based on the time at which the audit message was received, generated, or transmitted.

Content distribution system 304 also may send one or more audit messages after the auditable event(s) occur. For example, in a live streaming implementation, the times at which auditable events occur may be recorded and then sent to auditing system in one or more batches sent periodically or aperiodically during the live stream, or may be sent in one or more batches after the live stream has been completed.

Content distribution system 304 also may send one or more audit messages before the event occurs. For example, in an on-demand streaming implementation, content distribution system 304 may transmit one or more audit messages indicating one or more relative times at which an auditable event occurs in particular dynamic content. The one or more audit messages may be sent prior to client system 302 presenting the dynamic content, or while client system 302 presents the dynamic content, but prior to the occurrence of the one or more auditable events.

Process 400 includes one or more client systems 302 periodically or aperiodically transmitting one or more status messages to auditing system 308 (406). Generally, the status messages allow auditing system 308 to determine whether a particular client system 302 is presenting the dynamic content at a particular absolute or relative time. Status messages generally include presentation information that indicates information about the dynamic content presented, such as an identification of the dynamic content presented. Presentation information also may identify a particular state regarding the presentation of the identified dynamic content. For example, the status messages may indicate the beginning of presentation, continuing presentation, or the end of presentation.

To determine the absolute or relative time(s) at which client system 302 was presenting the dynamic content, the time that status message(s) are received may be recorded by auditing system 308. Assuming negligible transmission time from client system 302 to auditing system 308, the recorded times provide the absolute time (assuming any appropriate conversion, such as to a different time zone), and the relative time can be calculated from the recorded times.

In some implementations, the status messages may include the absolute or relative times at which client system 302 presents the dynamic content. For example, a status message may include a time stamp of the absolute time at which it was generated. As another example, a status message may include the amount of time that has elapsed since the presentation of the dynamic content started.

Status messages may include an identifier that uniquely identifies the client system sending the status message. For example, a globally unique identifier may be generated and included in the status messages. Such a unique identifier may allow the auditing system to determine the number of unique client systems presenting the dynamic content at a particular time if, for instance, client systems can present more than one presentation of the dynamic content at the same time and status messages are sent for each presentation.

Status messages also may include quality of service information that indicates the quality of the presentation of dynamic content at the client system. The quality of service information may be based, for example, on packet loss (for example, the number of packets lost while transmitting streaming content to the client system), number of dropped frames in a video presentation, and whether the codec used to present the dynamic content is re-started, and if so, how many times.

One or more status messages may be sent while client system 302 presents the dynamic content. For example, when the content is streaming content or downloaded content and client system 302 is able to communicate with auditing system 308, client system 302 may send status messages as the content is presented.

On the other hand, one or more status messages may be sent after client system 302 has completed presenting the dynamic content. For example, in an implementation in which the content is downloaded content, client system 302 may be a portable device that may or may not be able to communicate with auditing system 308 as client system 302 presents the content. Similarly, even if client system 302 is not a portable device, client system may not be able to communicate with auditing system 308. In such a situation, one or more status messages may be generated when the content is presented, but stored until client system 302 is able to communicate with auditing system 308. When client system 302 is able to communicate with auditing system 308, client system 302 then may send the one or more stored status messages.

In the event that it is known beforehand the times at which dynamic content will be presented, or the amount of the dynamic content that will be presented, then one or more status messages may be sent before client system 302 presents the dynamic content.

Continuing with process 400, auditing system 308 then performs an audit of the auditable event(s) related to the dynamic content using the status and audit messages (408). To do so, for instance, auditing system 308 may access presentation time information determined based, at least in part, on the presentation information included in the status messages. The presentation time information, for example, indicates one or more times at which a presentation of the particular dynamic content identified in the presentation information occurs on one or more client systems. The auditing system also may access event time information determined based, at least in part, on the event information included in the audit messages. The event time information, for example, indicates a time at which the particular auditable event identified in the event information occurs in the dynamic content. The audit may then be performed based on the presentation time information and the event time information.

The audit may include determining the number of unique client systems 302 that were presenting the dynamic content at the time(s) auditable event(s) occurred by counting the number of unique status messages corresponding to the time (s) the auditable event(s) occurred. If client systems 302 can present more than one presentation of the dynamic content at the same time and status messages are sent for each presentation, then the total number of presentations of the dynamic content by client systems 302 may be determined by counting the total status messages corresponding to the time(s) the auditable event(s) occurred. The audit may include other subsets of the number of client systems 302 presenting the dynamic content at the time(s) auditable event(s) occurred. For example, some percentage of the number of client systems 302 presenting the dynamic content may be determined.

Figure 5:
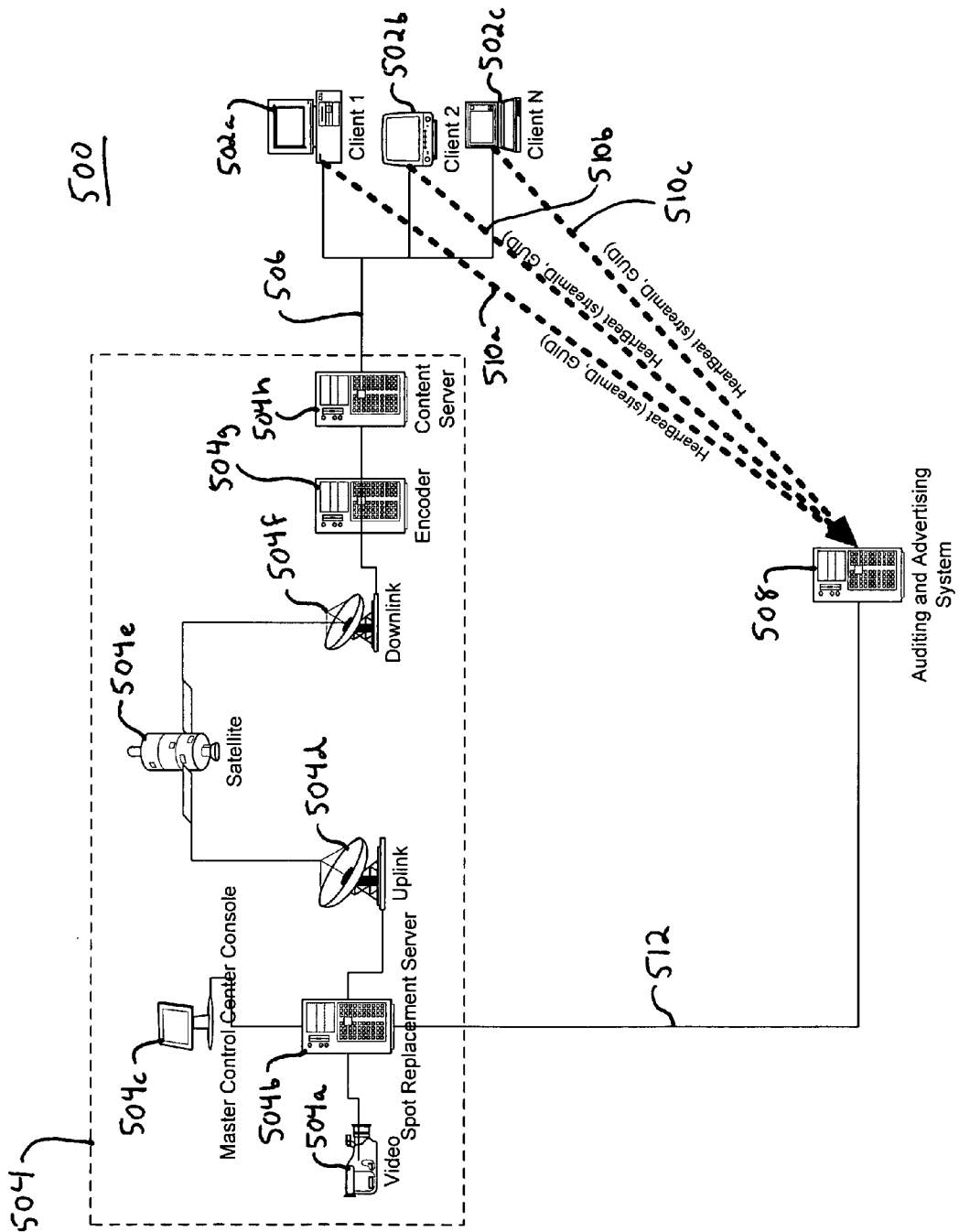
FIG. 5 is a diagram illustrating a live streaming implementation of the system shown in FIG. 3.

Referring to FIG. 5, a system 500 illustrates one particular live streaming implementation that includes multiple client systems 502a-502c connected to a content distribution system 504 through a distribution connection 506. Each of client systems 502a-502c is connected to an auditing and advertising system 508 through respective status connections 510a-510c. Auditing and advertising system 508 is connected to content distribution system 504 through an auditable event connection 512. Client systems 502a-502c, content distribution system 504, distribution connection 506, auditing and advertising system 508, status connections 510a-510c, and auditable event connection 512 are analogous to client system 302, content distribution system 304, distribution connection 306, auditing and advertising system 308, status connection 310, and auditable event connection 312, respectively.

Content distribution system 504 includes a source of programming content 504a, such as the television camera that is illustrated. Source 504a is connected to a spot replacement server 504b, which switches between source 504a and a source of advertising content under the control of a scheduler, such as media control center console 504c. Spot replacement server 504b is also connected to auditing and advertising system 508 through auditable event connection 512. Also connected to spot replacement server 504b is an uplink 504d. Uplink 504d is connected to downlink 504f through a satellite connection 504e. Downlink 504f is connected to one or more encoders 504g, which are connected to one or more content servers 504h. Content server(s) 504h are connected to the one or more client systems 502a-502c through one or more distribution connections 506.

Referring to FIG. 6, a process 600 illustrates one implementation of system 500 in which the auditable event(s) are the occurrence of advertising content in the live stream. In general, spot replacement server 504b provides a broadcast feed to encoder 504g through uplink 504d, satellite connection 504e, and downlink 504f. During certain potions of the broadcast feed, spot replacement server 504b provides programming content to encoder 504g (602). Encoder 504g encodes the broadcast into an appropriate digital format (604) and makes this stream available to one or more content servers 504h (606). Content servers 504h support multicast capabilities so that the stream may be delivered to multiple client systems 502a-502c.

Generally, one or more client systems 502a-502c communicate with content server 504h to obtain a media page, from which a user can select a live stream, such as the one sent from spot replacement server 504b, for presentation by a client system 502a-502c. More specifically, a web browser or media client application executing on a particular client system 502a-502c may request a media page from content server 504h (608). In response to the request, content server 504h provides a media page (610), for example a web page, for presentation by the web browser or media client application.

The web page presents one or more live streaming selections, including the live stream provided from spot replacement server 504b in operation 602. When a user selects a live stream, the corresponding client system 502a-502c requests the selected live stream (612), which is sent to client system 502a-502c (614) by content server 504h through distribution connection 506. Client system 502a-502c then begins presenting the live stream.

When a client system 502a-502c begins presenting the live stream provided by spot replacement server 504b, client system 502a-502c receives an identifier of the stream (a streamID), either from the live stream or derived, for example, from the web page serving the stream. Client system 502a-502c also creates a globally unique identifier (GUID) that identifies the particular client system 502a-502c. Client system 502a-502c then sends auditing and advertising system 508 a connect status message through status connection 510a-510c. The connect status message includes the streamID and GUID (616). Client system 502a-502c then periodically or aperiodically sends a presenting status message (which includes streamID and GUID) (618) until client system 502a-502c disconnects from the stream (some presenting messages are shown with dotted lines to promote clarity of the figure). Client system 502a-502c then sends a disconnect status message with the streamID and the GUID (620). If client system 502a-502c attaches to a different stream it would then send status messages with the new streamID.

Master control center console 504c controls when spot replacement server 504b provides programming content from programming content source 504a and when spot replacement server 504b switches to an advertising content source. Master control center console 504c indicates to spot replacement system 504b the timing of when advertising content should be sent (620), for example, indicating that an advertising break is coming up. This indication may be in the form of, for example, a relay closure, or an extensible mark-up language (XML) feed sent by a web page on master control center console 504c.

When spot replacement system 504b receives the indication, spot replacement server 504b requests that auditing and advertising system 508 determine what advertising content should be sent (622). Auditing and advertising system 508 then selects particular advertising content to be sent (624). To do so, auditing and advertising system 508 may store business rules regarding various advertising campaigns and execute software that evaluates those business rules to determine particular advertising content. The business rules regarding an advertising campaign define the parameters under which associated advertising media should be presented, such as the time of day during which the advertising media should be presented (for example, at night or mid-afternoon), the percentage of the population to whom the advertising media should be presented, the frequency with which the advertising media should be presented, and/or the geographic location(s) of the users to whom the advertising media should be presented. The selection of advertising content also may be informed by consulting log files or schedules to determine the length of the ad break that is available to be filled.

Advertising and auditing system 508 then indicates the selected advertising content to spot replacement system 504b (626). Spot replacement system 504b then switches between the programming content source 504a to a source of the selected advertising content at the scheduled time, for example, when an advertising break occurs (628). This results in the advertising content being sent to encoder 504g (630), which encodes the advertising content (632) and provides the encoded advertising content to content server 504h (634). Content server 504h sends the encoded advertising content to client system 502a-502c (636).

Spot replacement system 504b also sends auditing and advertising system 508 an audit message through auditable event connection 512 (638). The audit message includes an identifier of the advertising content (advertising ID). The audit message also may include an identifier of the stream (streamID) in which the advertising content is located.

In addition, the audit message may include the absolute time at which the advertising content is starting. For example, the audit message may include the absolute time in an implementation in which the audit messages are not sent at substantially the same time that the advertising content is sent. Even in implementations in which the audit message is sent at substantially the same time, the audit message may include the absolute time.

Auditing and advertising system 508 then performs an audit of the advertising content (640). For example, auditing and advertising system 508 creates a table that tracks how many GUIDs (and, hence, unique client systems) are connected to any given stream, such as the stream provided by spot replacement serer 504b. When an audit message is received by auditing and advertising system 508 from spot replacement server 504b, the number of connected GUIDs are tallied and recorded for the advertising content identified in the auditing message.

Referring to FIG. 7A, auditing and advertising system 508 creates a table such as table 700 to track the number of unique client systems presenting a stream at any given time. Table 700 includes a column 702 containing the streamIDs of different streams and a column 704 that includes the corresponding number of unique client systems currently presenting the stream. For example, the stream with streamID 101 has 1000 unique client systems currently presenting the stream.

Referring to FIG. 7B, auditing and advertising system 508 can use table 700 to create table 750 as audit messages are received from spot replacement server 504b. As auditing and advertising system 508 receives an audit message, auditing and advertising system 508 consults table 700 to determine the number of unique users currently connected to the streamID indicated in the audit message. Auditing and advertising system 508 then records an advertising ID 752 from the audit message, and a date 754 and a time 756 that the audit message was received (or as indicated by the audit message, depending on the implementation), and the number of unique client systems connected to the stream 758 from table 700. For example, because 9:58 am is taken to be the current time, as indicated in the last row of Table 750, the number of currently connected unique users 704 from Table 700 (that is, 1000) has been inserted into Table 750 as the number of unique users connected 758 at 9:58 am.

Figure 8:
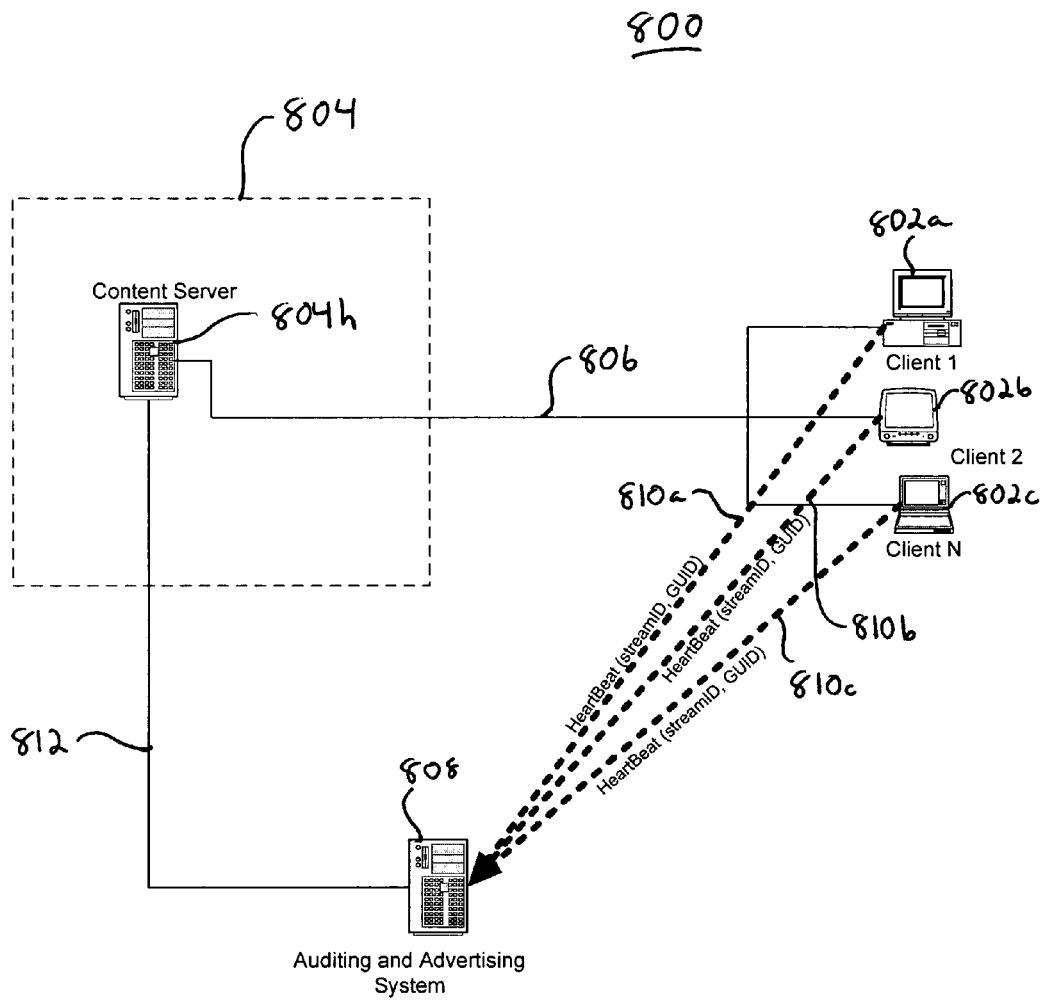
FIG. 8 is a diagram showing an on-demand implementation of the system shown in FIG. 3.

Referring to FIG. 8, a system 800 illustrates one on-demand streaming implementation that includes client systems 802a-802c connected to a content distribution system 804 through a distribution connection 806. An auditing and advertising system 808 is connected to client systems 802a-802c through one or more status connections 810a-810c and, and to distribution system 804 through an auditable event connection 812.

System 800 is similar to system 500 and the elements of system 800 are analogous to similarly labeled elements in system 500. One difference is that the stream provided to client system 802a-802c is not a live broadcast stream, but rather is pre-encoded and pre-stored, for example, on a content server 804h. Thus, any of client systems 802a-802c may access and present the stream from the beginning at any given time.

Figure 9:
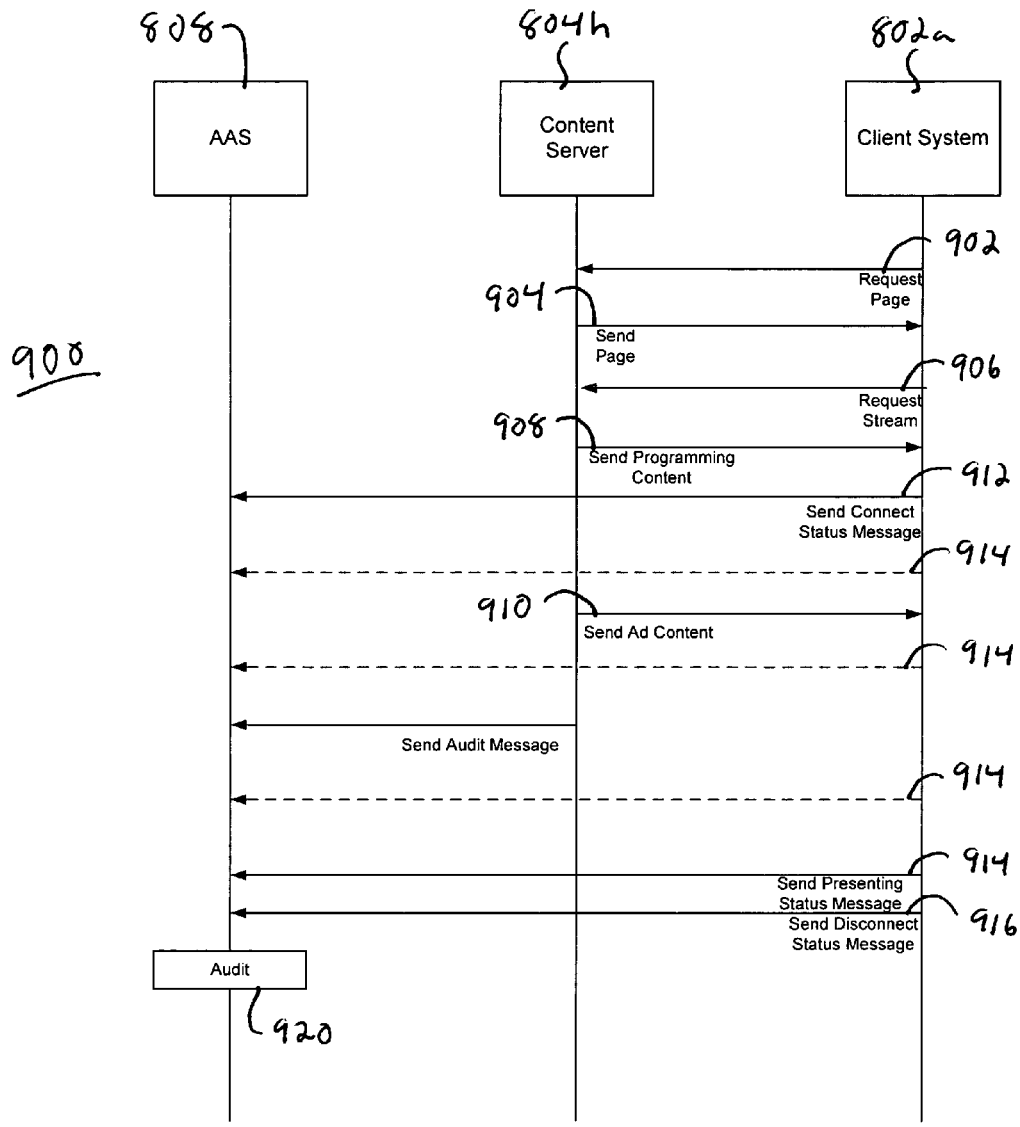
FIG. 9 is a diagram illustrating an example of communications between the components of the implementation of FIG. 8.

Referring to FIG. 9, a process 900 illustrates one method of using system 800. In process 900, client system 802a may request a media page from content server 804h (902) and content server 804h returns the media page (904). The media page provides a selection of one or more on-demand streams. When a user selects an on-demand stream using client system 802a (906), content server 804h sends the stream to client system 802a for presentation.

The on-demand stream may include programming content (908) and advertising content (910). While not shown in FIG. 9, in some implementations, when a user selects an on-demand stream, content server 804h may communicate with advertising and auditing system 808 to select the particular advertising content provided as part of the on-demand stream.

When client system 802a begins presenting the on-demand stream, client system 802a sends a connect status message to auditing and advertising system 808 (912). The connect status message includes a streamID and a GUID. Client system 802a then sends a presenting status message periodically or aperiodically (914) until the on-demand stream is completed, or until the user stops the presentation of the on-demand stream. When the on-demand stream is completed or the user stops the presentation of the on-demand stream, client system 802*a* sends a disconnect status message to auditing and advertising system 808 (916).

Content server 804*h* sends one or more audit messages to auditing and advertising system 808 (918). The audit messages include the relative timing(s) of the advertising content in the on-demand stream, identification(s) of the advertising content, and a streamID of the on-demand stream.

Auditing and advertising system 808 performs an audit of the advertising content on a periodic or aperiodic basis (920). For example, auditing and advertising system 808 may determine the number of unique client systems 802*a*-802*c* that present particular advertising content each day, week, or month. Based on the status messages received from a client system, auditing and advertising system 808 can determine how long the client system presented a particular on-demand stream. Given the corresponding audit message for the on-demand stream, auditing and advertising system 808 can determine the relative timing(s) of the advertising content in the particular on-demand stream. As a result, auditing and advertising system 808 can determine whether the on-demand stream was presented long enough so that particular advertising content was presented by a client system. For instance, if particular advertising content occurs one minute into an on-demand stream and a client system presented on-demand stream for five minutes, then auditing and advertising system 808 can mark the particular advertising content as having been presented by the client system. Auditing and advertising system 808 can then tally the number of unique client systems 802*a*-802*c* that presented particular advertising content.

The techniques described above are not limited to any particular hardware or software configuration. Rather, they may be implemented using hardware, software, firmware or a combination of them. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (for example, CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, the content distribution system may be a cable television distribution system, the distribution connection may be a cable television network, and the client system may be a personal video recorder, such as a Tivo® system made by Tivo Inc. of Alviso, Calif. A personal video recorder records the content delivered by the cable television network for contemporaneous or later viewing by a user. A personal video recorder may derive an identification of the content from the cable television stream or from other information accessed, for example, by communicating across the Internet or another network (e.g., the Public Switched Telephone Network (PSTN)). For example, Zap2it of Santa Monica, Calif. provides television guide information that may be accessed through the Internet and used by a personal video recorder. The personal video recorder may generate status messages that include an identifier of the content presented and may include the absolute or relative times at which the content is presented. The status messages then may be sent to an auditing system by communicating across the Internet or other network.

Also, while the foregoing has described the use of the HTTP protocol and HTML, other standard or proprietary protocols may be used. In addition, while the auditing system 308 has been illustrated as a separate system, the auditing system 308 may be incorporated into other components such as the client systems 302 or the content distribution system 304. Moreover, while a scheduler (media control center console 504*c*) has been illustrated as part of the content distribution system 504, the scheduler may be a separate entity, and may be incorporated into other components such as the auditing and advertising system 508. Furthermore, elements of different implementations may be combined, deleted, added, supplemented or modified to yield further implementations. In addition, actions or communications do not necessarily need to occur in the order in which they are depicted. Accordingly, other implementations are within the scope of the following claims.

What is claimed is:

1. A method comprising:
receiving a status message from a client system;
determining, from the status message, presentation time information indicating one or more times at which a presentation of dynamic content occurs at the client system;
accessing, by at least one processor, the presentation time information, wherein an auditable event occurs at a particular time within the dynamic content;
receiving an audit message;
determining, based on a time at which the audit message is received, event time information indicating the particular time at which the auditable event occurs within the dynamic content;
accessing, by the at least one processor, the event time information; and
determining, by the at least one processor and based on the presentation time information and the event time information, whether the dynamic content was being presented at the client system at the particular time at which the auditable event occurs within the dynamic content, wherein the dynamic content is determined to be presented at the client system when the presentation time indicates that the dynamic content was presented for a duration greater than a predetermined time period associated with the particular time indicated by the event time information.

2. The method of claim 1 wherein determining the presentation time information comprises determining the presentation time information based on a time at which the status message is received from the client system.

3. The method of claim 1 wherein receiving the status message from the client system comprises receiving the status message from the client system prior to the client system presenting the dynamic content.

4. The method of claim 1 wherein receiving the status message from the client system comprises receiving the status message from the client system after the client system presents the dynamic content.

5. The method of claim 1 wherein receiving the status message from the client system comprises receiving the status message from the client system while the client system presents the dynamic content.

6. The method of claim 1 wherein receiving the audit message comprises receiving the audit message from a content distribution system.

7. The method of claim 1 wherein receiving the audit message comprises receiving the audit message from a scheduler.

8. The method of claim 1 wherein:
accessing the presentation time information includes accessing presentation information at the client system; and
accessing the event time information includes accessing event time information at the client system.

9. The method of claim 1 wherein:
accessing the presentation time information includes accessing presentation information at an auditing system separate from the client system and a content distribution system; and
accessing the event time information includes accessing event time information at the auditing system separate from the client system and the content distribution system.

10. The method of claim 1 wherein:
accessing the presentation time information includes accessing presentation information at a content distribution system; and
accessing the event time information includes accessing event time information at the content distribution system.

11. The method of claim 1 wherein the auditable event includes an occurrence of advertising content in the dynamic content such that accessing the event time information comprises accessing event time information indicating the particular time at which an occurrence of advertising content occurs in the dynamic content.

12. The method of claim 1 wherein the auditable event includes an occurrence in the dynamic content of an instruction to present advertising content in proximity to a presentation of the dynamic content such that accessing the event time information comprises accessing event time information indicating the particular time at which an instruction to present advertising content in proximity to a presentation of the dynamic content occurs in the dynamic content.

13. The method of claim 1 wherein the dynamic content includes live streaming content such that accessing presentation time information comprises accessing presentation time information indicating one or more times at which a presentation of live streaming content occurs at the client system.

14. The method of claim 1 wherein the dynamic content includes on-demand streaming content such that accessing presentation time information comprises accessing presentation time information indicating one or more times at which a presentation of on-demand streaming content occurs at the client system.

15. The method of claim 1 further comprising receiving quality of service information from the client system, the quality of service information indicating a quality of the presentation of the dynamic content at the client system.

16. A computer-usable medium having a computer program embodied thereon, the computer program comprising instructions for causing a computer to perform the following operations:
receive a status message from a client system;
determine, from the status message, presentation time information indicating one or more times at which a presentation of dynamic content occurs at the client system;
access, by at least one processor, the presentation time information, wherein an auditable event occurs at a particular time within the dynamic content;
receive an audit message;
determine, based on a time at which the audit message is received, event time information indicating the particular time at which the auditable event occurs within the dynamic content;
access, by the at least one processor, the event time information; and
determine, by the at least one processor and based on the presentation time information and the event time information, whether the dynamic content was being presented at the client system at the particular time at which the auditable event occurs within the dynamic content, wherein the dynamic content is determined to be presented at the client system when the presentation time indicates that the dynamic content was presented for a duration greater than a predetermined time period associated with the particular time indicated by the event time information.

17. The medium of claim 16 wherein the dynamic content includes live streaming content such that the instructions causing the computer to access presentation time information comprise instructions causing the computer to access presentation time information indicating one or more times at which a presentation of live streaming content occurs at the client system.

18. A method of determining a number of client systems presenting dynamic content when an auditable event occurs in the dynamic content, the method comprising:
receiving, at an auditing system, status messages from one or more client systems, wherein the status messages are sent by the one or more client systems as the one or more client systems present dynamic content and the status messages identify the dynamic content being presented by the one or more client systems, wherein the auditing system comprises one or more processors;
determining, by the at least one processor and based on the status messages, one or more presentation times at which the one or more client systems present the dynamic content;
receiving, at the auditing system, an audit message from a content distribution system, the audit message indicating an occurrence of an auditable event in the dynamic content;
determining, based on the audit message, an event time at which the auditable event occurs in the dynamic content; and
determining, based on the one or more presentation times and the event time, a number of client systems presenting the dynamic content when the auditable event occurs in the dynamic content, wherein the dynamic content is determined to be presented at one or more of the client systems when the one or more presentation times indicate that the dynamic content was presented for a duration greater than a predetermined time period associated with the particular time indicated by the event time information.

19. A method comprising:
receiving a status message from a client system;
determining, from the status message, presentation time information indicating one or more times at which a presentation of dynamic content occurs at the client system;

accessing, by at least one processor, the presentation time information, wherein an auditable event occurs at a particular time within the dynamic content;

receiving an audit message including an audit identifier identifying the auditable event, a client identifier identifying the client system, and a stream identifier identifying a stream for transmission of the auditable event to the client system;

determining, based on a time at which the audit message is received, event time information indicating the particular time at which the auditable event occurs within the dynamic content;

accessing, by the at least one processor, the event time information;

determining, by the at least one processor and based on the presentation time information, the event time information, and the client system identifier, whether the dynamic content was being presented at the client system at the particular time at which the auditable event occurs within the dynamic content, wherein the dynamic content is determined to be presented at the client system when the presentation time indicates that the dynamic content was presented for a duration greater than a predetermined time period; and incrementing a count value associated with the audit identifier and the stream identifier when the dynamic content is determined to be presented at the client system at the particular time, wherein the count value indicates a number of client systems that receive the auditable event associated with the audit identifier over the stream associated with the stream identifier.

20. The method of claim 19 wherein receiving the status message from the client system comprises receiving the status message from the client system prior to the client system presenting the dynamic content.

21. The method of claim 19 wherein receiving the status message from the client system comprises receiving the status message from the client system after the client system presents the dynamic content.

22. The method of claim 19 wherein receiving the status message from the client system comprises receiving the status message from the client system while the client system presents the dynamic content.

23. The method of claim 19 wherein the auditable event includes an occurrence of advertising content in the dynamic content, the advertising content being identified by the auditable identifier.

24. The method of claim 19 further comprising receiving quality of service information from the client system, the quality of service information indicating a quality of the presentation of the dynamic content at the client system.

25. The method of claim 19 further comprising updating billing information associated with the auditable event based on the count value.

* * * * *